(12) United States Patent
Yih

(10) Patent No.: US 6,276,706 B1
(45) Date of Patent: Aug. 21, 2001

(54) SHOCK-ABSORBING JOINT FOR INTERCONNECTING FRONT AND REAR WHEEL-CARRYING FRAME MEMBERS OF A BICYCLE

(75) Inventor: Johnson Yih, Taichung Hsien (TW)

(73) Assignee: Giant Manufacturing Co., Ltd., Taiwan (CN)

( * ) Notice: Subject to any disclaimer, the term of this patent is extended or adjusted under 35 U.S.C. 154(b) by 0 days.

(21) Appl. No.: 09/304,048

(22) Filed: May 4, 1999

(51) Int. Cl.[7] ........................................ B62K 3/02
(52) U.S. Cl. ............................... 280/284; 280/283
(58) Field of Search ........................ 280/284–286

(56) References Cited

U.S. PATENT DOCUMENTS

| | | | |
|---|---|---|---|
| 5,205,572 | * 4/1993 | Buell et al. | 280/284 |
| 5,295,702 | * 3/1994 | Buell | 280/284 |
| 5,370,411 | * 12/1994 | Takamiya et al. | 280/284 |
| 5,409,248 | * 4/1995 | Williams | 280/284 |
| 5,435,584 | * 7/1995 | Buell | 280/284 |
| 5,553,881 | * 9/1996 | Klassen et al. | 280/284 |
| 5,570,896 | * 11/1996 | Collins | 280/284 |
| 5,671,936 | * 9/1997 | Turner | 280/284 |
| 5,772,228 | * 6/1998 | Owyang | 280/284 |
| 5,813,683 | * 9/1998 | Kulhawik et al. | 280/284 |
| 5,865,456 | * 2/1999 | Busby et al. | 280/284 |

* cited by examiner

Primary Examiner—J. J. Swann
Assistant Examiner—L. Lum
(74) Attorney, Agent, or Firm—Foley & Lardner

(57) ABSTRACT

A shock-absorbing joint includes a tubular casing connected securely to the front wheel-carrying frame member of a bicycle, and confining an accommodating space with a central axis that is disposed horizontally and that extends in a transverse direction relative to a riding direction of the bicycle. A coupling shaft is disposed in the accommodating space, and extends along the central axis of the accommodating space. A spiral spring plate is disposed in the accommodating space, and has an innermost end connected to the coupling shaft and an outermost end connected to the tubular casing. The spiral spring plate is wound about the coupling shaft to form a series of interconnected turns of increasing radius. A connecting bracket is connected securely to a rear wheel-carrying frame member of the bicycle. The tubular casing is mounted rotatably on the connecting bracket, while the coupling shaft is mounted non-rotatably on the connecting bracket.

17 Claims, 4 Drawing Sheets

SHOCK-ABSORBING JOINT FOR INTERCONNECTING FRONT AND REAR WHEEL-CARRYING FRAME MEMBERS OF A BICYCLE

FIELD OF THE INVENTION

The invention relates to a shock-absorbing joint, more particularly to a shock-absorbing joint for interconnecting front and rear wheel-carrying frame members of a bicycle.

BACKGROUND OF THE INVENTION

A shock-absorbing joint for interconnecting front and rear wheel-carrying frame members of a bicycle is known in the art. The known shock-absorbing joint generally includes a hydraulic (or pneumatic) cylinder (or piston) and a spring associated with the cylinder in order to absorb the shock experienced by the bicycle when the latter is in use. However, the following disadvantages result from the use of the known shock-absorbing joint:

(1) In case the known shock-absorbing joint has a relatively long cylinder arm for connection with one of the front and rear wheel-carrying frame members, the cylinder arm can travel a long distance so as to provide sufficient shock-absorbing effects. However, in order to achieve such effects, the spring employed therein must possess a relatively large spring force, thereby reducing the shock-absorbing effect.

(2) In case the known shock-absorbing joint has a relatively short cylinder arm for connection with one of the front and rear wheel-carrying frame members, the distance that is traveled by the cylinder arm is very short, thereby consequently resulting in poor shock-absorbing effects.

SUMMARY OF THE INVENTION

Therefore, the main object of this invention is to provide a shock-absorbing joint for interconnecting front and rear wheel-carrying frame members of a bicycle and capable of providing excellent shock-absorbing effects.

Accordingly, the shock-absorbing joint of the present invention is adapted to interconnect a front wheel-carrying frame member and a rear wheel-carrying frame member of a bicycle, and includes a tubular casing, a coupling shaft, a spiral spring plate, and a connecting bracket. The tubular casing is adapted to be connected securely to one of the front and rear wheel-carrying frame members. The tubular casing confines an accommodating space which defines a central axis that is disposed horizontally and that extends in a transverse direction relative to a riding direction of the bicycle. The coupling shaft is disposed in the accommodating space, and extends along the central axis of the accommodating space. The spiral spring plate is disposed in the accommodating space, and has an innermost end connected to the coupling shaft and an outermost end connected to the tubular casing. The spiral spring plate is wound about the coupling shaft to form a series of interconnected turns of increasing radius. The connecting bracket is adapted to be connected securely to the other one of the front and rear wheel-carrying frame members. The tubular casing is mounted rotatably on the connecting bracket. The coupling shaft is mounted non-rotatably on the connecting bracket.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
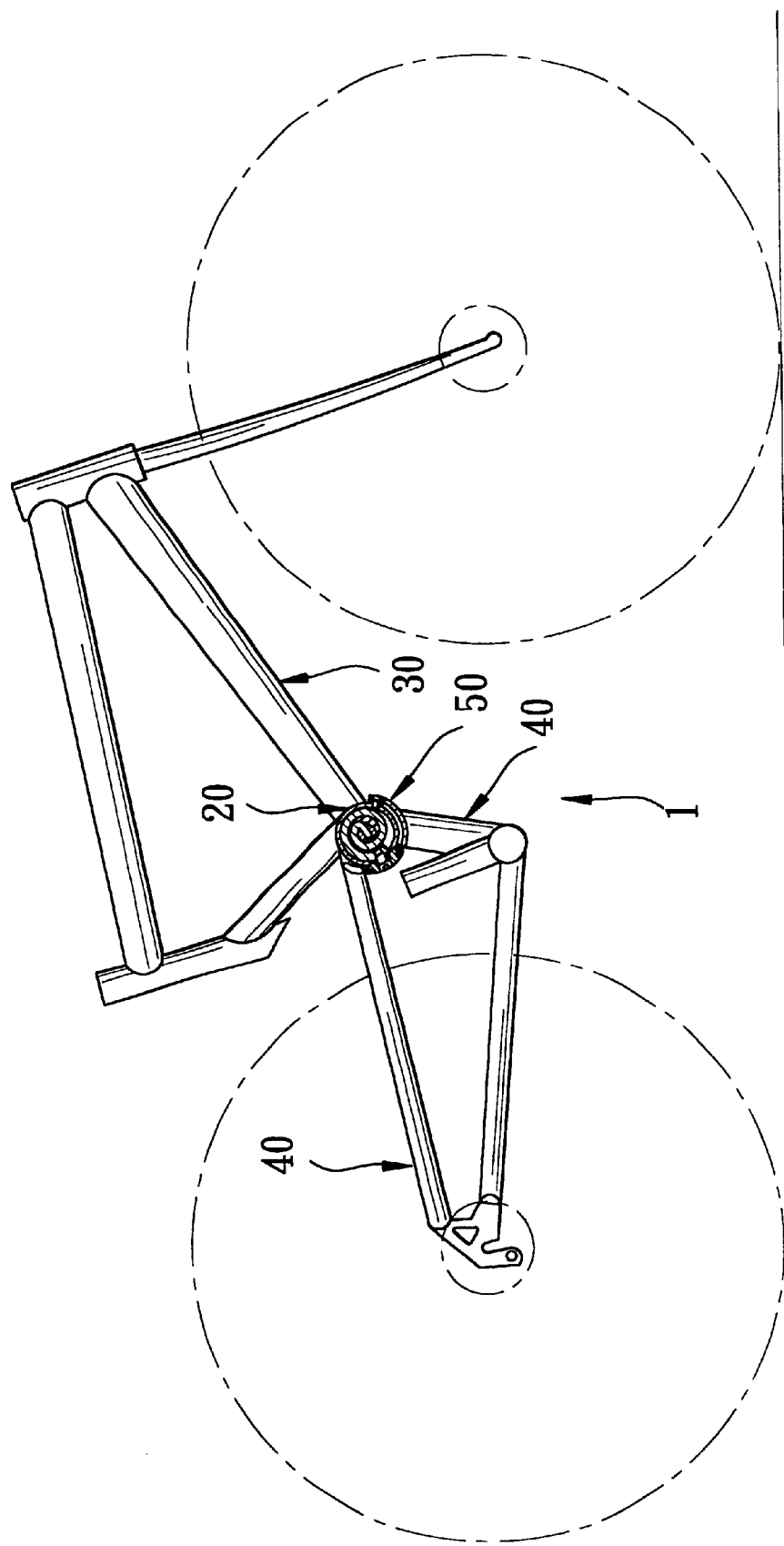
FIG. 1 is a fragmentary and partly sectional view of a shock-absorbing joint of the present invention for interconnecting front and rear wheel-carrying frame members of a bicycle.
Figure 2:
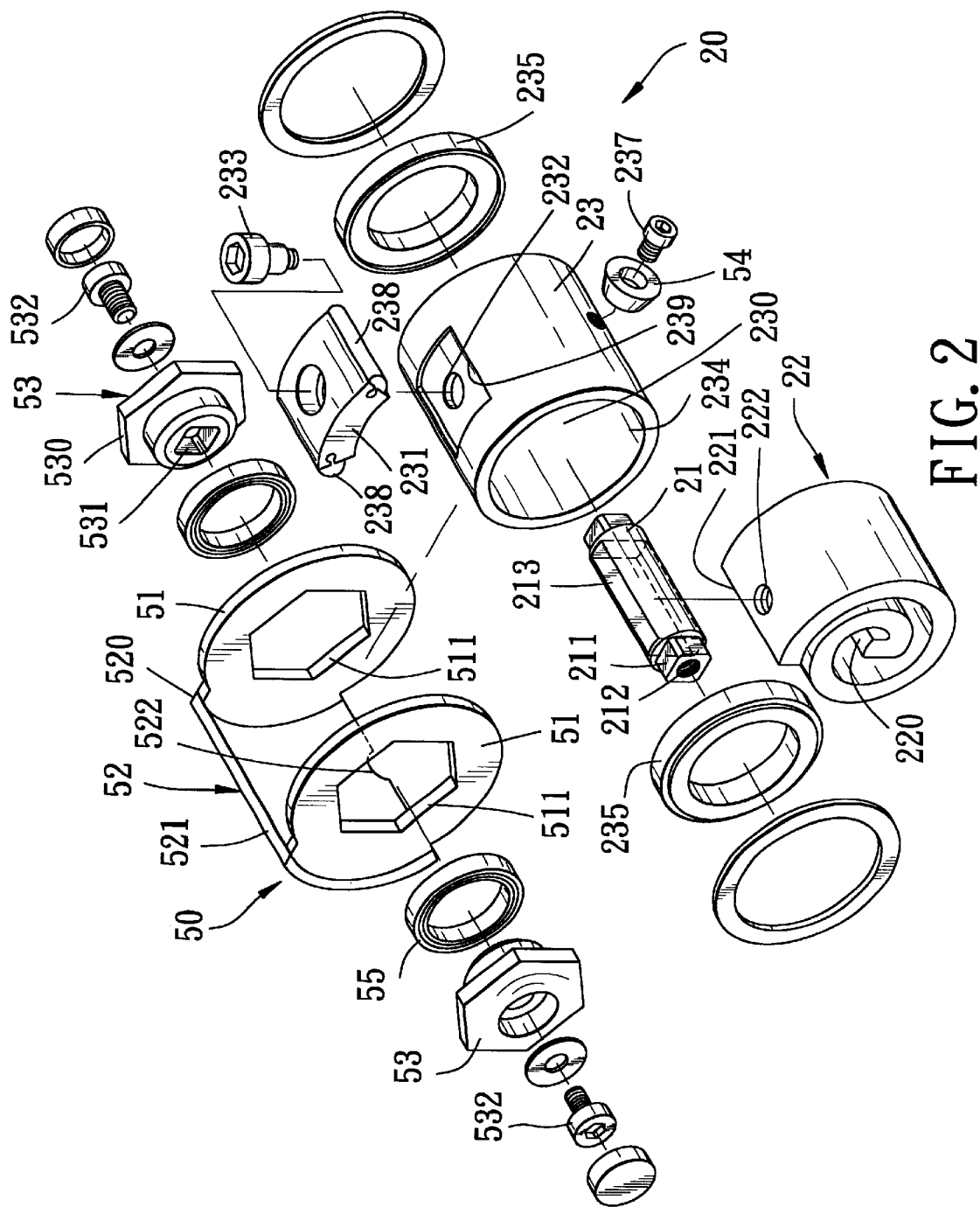
FIG. 2 is an exploded view of the shock-absorbing joint of the present invention.
Figure 3:
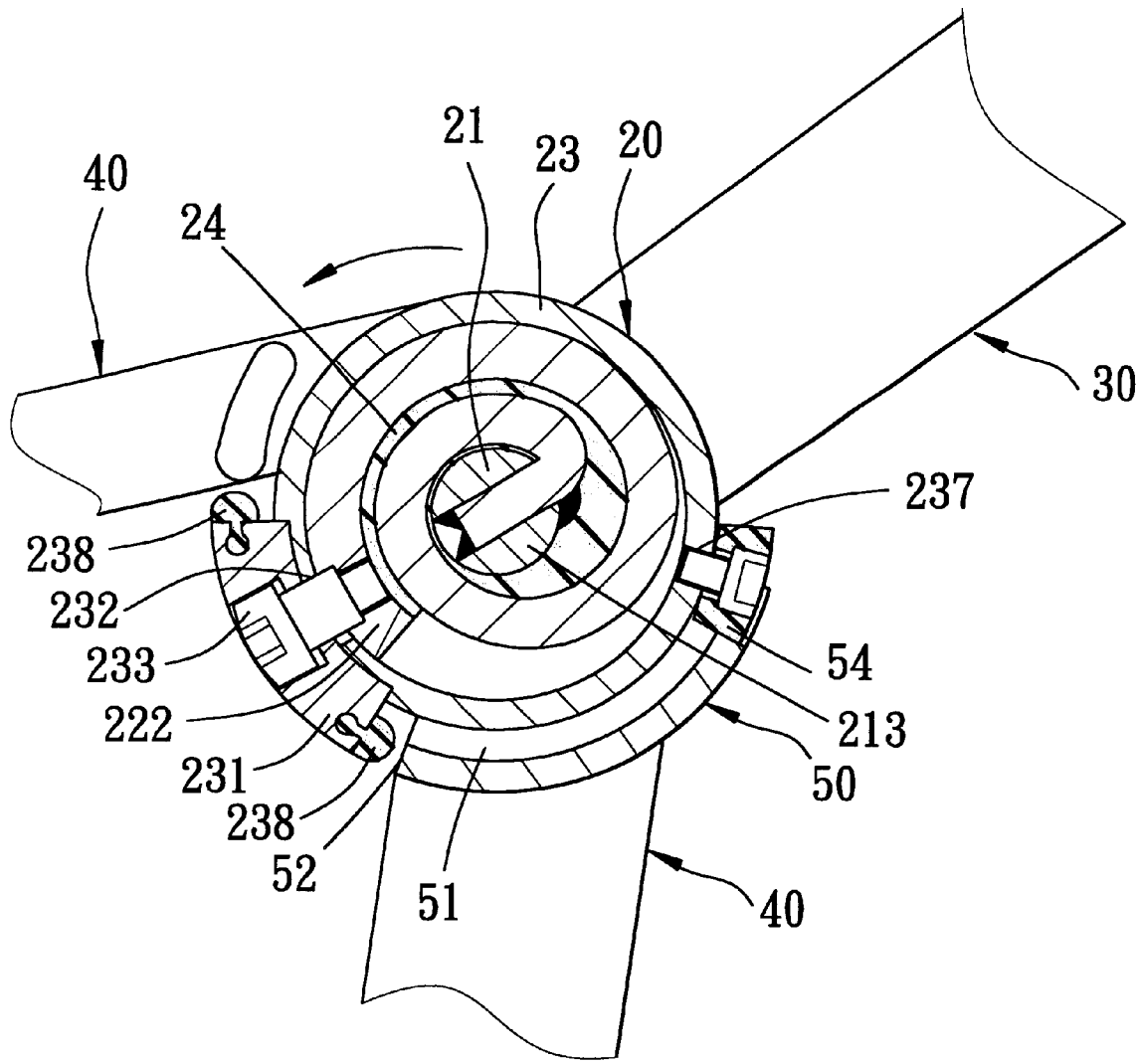
FIG. 3 is an enlarged, fragmentary and cross-sectional view of the shock-absorbing joint of the present invention, illustrating how the front and rear wheel-carrying frame members of the bicycle are interconnected.

Referring to FIGS. 1, 2 and 3, the preferred embodiment of a shock-absorbing joint according to the present invention is adapted to interconnect a front wheel-carrying frame member 30 and a rear wheel-carrying frame member 40 of a bicycle 1. The preferred embodiment includes a tubular casing 20, a coupling shaft 21, a spiral spring plate 22, and a connecting bracket 50.

As illustrated, a tubular casing 20 is connected securely, such as by welding, to the front wheel-carrying frame member 40 of the bicycle. The tubular casing 20 includes a circumferential wall 23 which confines an accommodating space 230 therewithin with a central axis that is disposed horizontally and that extends in a transverse direction relative to a riding direction of the bicycle. The circumferential wall 23 has a stop member 54 mounted on an outer surface thereof by the use of a screw fastener 237. Preferably, the stop member 54 is made from an elastomeric material.

The coupling shaft 21 is disposed in the accommodating space 230 of the circumferential wall 23, and extends along the central axis of the accommodating space 230.

The spiral spring plate 22 is disposed in the accommodating space 230 of the circumferential wall 23. The spiral spring plate 22 has an innermost end 220 connected to the coupling shaft 21, and an outermost end 221 connected to the circumferential wall 23. The spiral spring plate 22 is wound about the coupling shaft 21 to form a series of interconnected turns of increasing radius.

The connecting bracket 50 is connected securely to the front wheel-carrying frame member 30 of the bicycle. The tubular casing 23 is mounted rotatably on the connecting bracket 50. The coupling shaft 21 is mounted non-rotatably on the connecting bracket 50.

As shown in FIG. 3, the spiral spring plate 22 is formed by bending continuously an elongated metal plate into the series of interconnected turns with the increasing radius, thereby defining a plurality of clearances between adjacent ones of the turns and between an innermost one of the turns and the coupling shaft 21.

A cushioning filler 24, made from an elastomeric material or foamed material, is disposed in the circumferential wall 23, and fills the clearances that are defined by the spiral spring plate 22.

Figure 4:
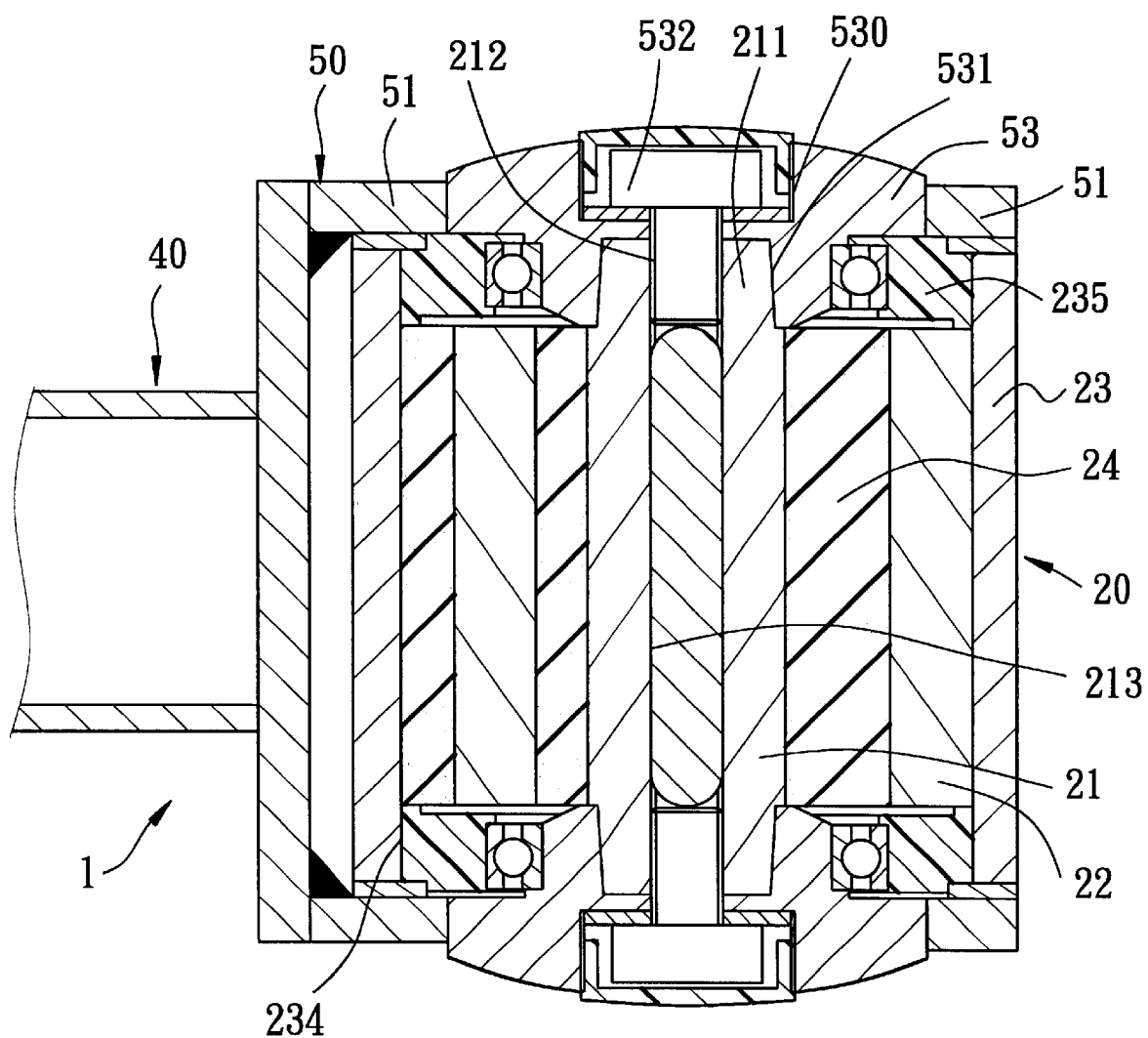
FIG. 4 is another enlarged, fragmentary and cross-sectional view of the shock-absorbing joint of the present invention.

In the preferred embodiment, the connecting bracket 50 includes a connecting plate 52 that extends longitudinally in the transverse direction and that has left and right ends 520, and left and right support plates 51 that extend respectively and transversely from the left and right ends 520 of the connecting plate 52 to flank opposite ends 234 of the circumferential wall 23. The connecting plate 52 is connected securely, such as by welding, to the rear wheel-carrying frame member 40 (see FIG. 4). The left and right support plates 51 have the opposite ends 234 of the circumferential wall 23 mounted rotatably thereon, and further have opposite end portions 211 of the coupling shaft 21 mounted non-rotatably thereon.

Each of a pair of cap members 53 has an outer portion 530 that is mounted non-rotatably on a respective one of the left and right support plates 51, and an inner portion 531 that extends into a respective one of the opposite ends 234 of the circumferential wall 23. Preferably, the left and right support plates 51 are formed with non-circular openings 511, such as hexagonal openings, therethrough. The outerportion 530 of each of the cap members 53 has a cross-section that complements the openings 511 in the respective one of the left and right support plates 51 to enable non-rotatable engagement of the cap members 51 with the left and right support plates 51 in the openings 511.

A pair of bearing members 55 couple rotatably and respectively the opposite ends 234 of the circumferential wall 23 and the inner portions 531 of the cap members 53. Preferably, the opposite ends 234 of the circumferential wall 23 are provided with two bearing-retention rings 235 in order to mount the bearings members 55 therein. Each of the opposite end portions 211 of the coupling shaft 21 is formed with a non-circular cross-section, such as rectangular, along a plane transverse to the central axis. The inner portion 531 of each of the cap members 53 is formed with a socket that engages non-rotatably a respective one of the end portions 211 of the coupling shaft 21. Preferably, each of the end portions 211 of the coupling shaft 21 is formed with an internally threaded axial bore 212 such that a screw fastener 532 extends through a respective one of the cap members 53 and engages the axial bore 212 in a respective one of the end portions 211 of the coupling shaft 21.

In this preferred embodiment, one of the abutment edges 521 of the connecting plate 52 is formed with a notch 522 that is registered with the stop member 54. The outermost end 221 of the spiral spring plate 22 is formed with a threaded hole 222 therethrough. The circumferential wall 23 is formed with a plate-retention recess 239 and a radial hole 232 that communicates the accommodating space 230 with an exterior thereof and that is aligned with the threaded hole 222 in the spiral spring plate 22. A fastener plate 231 is disposed in the plate-retention recess 239 in such a manner that a portion thereof projects radially and outwardly from the circumferential wall 23. A screw fastener 233 is extended through a hole in the fastener plate 231 and the radial hole 232 in the circumferential wall 23 to engage the threaded hole 222 in the spiral spring plate 22, thereby connecting securely the outermost end 221 of the spiral spring plate 22 to the circumferential wall 23. The fastener plate 231 has two opposite edges provided with a pair of cushioning bumpers 238, respectively. Each of the cushioning bumpers 238 is rotatable with the circumferential wall 23 relative to the connecting bracket 50. One of the cushioning bumper 238 is capable of abutting against one of the abutment edges 521 of the connecting plate 231 to limit rotation of the circumferential wall 23 relative to the connecting bracket 50 in the certain direction. Preferably, the cushioning bumpers 238 are made of an elastomeric material. The coupling shaft 21 is formed with an axially extending slot 213 for engaging securely the innermost end 220 of the spiral spring plate 22. Alternatively, the innermost end 220 of the spiral spring plate 22 can be integrally formed with the coupling shaft 21 in order to achieve firm engagement therebetween.

As best shown in FIG. 1, in case the circumferential wall 23 is turned about the central axis in the anti-clockwise direction due to a collision action or braking operation so as to bring the spiral spring plate 22 to wind about the coupling shaft 21 in the same direction, the cushioning bumper 238 will abut against one of the abutment edges 521 of the connecting plate 52 to result in a cushioning action by virtue of the non-rotatable mounting of the coupling shaft 21 relative to the connecting bracket 50 and the cushioning filler 24 so as to counteract the movement jay in the anti-clockwise direction. In case, the connecting plate 52 is turned about the central axis in the anti-clockwise direction so as to bring the coupling shaft 21 together therewith, the stop member 54 will abut against the other one of the abutment edges 521 of the connecting plate 52 by virtue of a restoration force of the spiral spring plate 22 and the filler 24 relative to the circumferential wall 23 so as to result in another cushioning effects and to counteract the movement in the anti-clockwise direction. Thus, the vibrations of the front and rear wheel-carrying frame members 30, 40 of the bicycle 1 (see FIG. 1) will be considerably absorbed. Since the shock-absorbing joint of this invention eliminates the need for a cylinder and spring arrangement to interconnect the front and rear wheel-carrying frame members 30, 40 as taught in the prior art, and since there is no noise generated during collision of the cushioning bumper 238 and the stop member 54 against the abutment edges 521 of the connecting plate 52, the disadvantages that result from the use of the known shock-absorbing joint can be avoided.

With this invention thus explained, it is apparent that numerous modifications and variations can be made without departing from the scope and spirit of this invention. It is therefore intended that this invention be limited only as indicated in the appended claims.

I claim:
1. A shock-absorbing joint adapted to interconnect a front wheel-carrying frame member and a rear wheel-carrying frame member of a bicycle, said shock-absorbing joint comprising:

a tubular casing adapted to be connected securely to one of the front and rear wheel-carrying frame members, said tubular casing confining an accommodating space which defines a central axis that is disposed horizontally and that extends in a transverse direction relative to a riding direction of the bicycle;

a coupling shaft disposed in said accommodating space and extending along the central axis of said accommodating space;

a spiral spring plate disposed in said accommodating space, and having an innermost end connected to said coupling shaft and an outermost end connected to said tubular casing, said spiral spring plate being wound about said coupling shaft to form a series of interconnected turns of increasing radius; and a connecting bracket adapted to be connected securely to the other one of the front and rear wheel-carrying frame members, said tubular casing being mounted rotatably on said connecting bracket, said coupling shaft being mounted non-rotatably on said connecting bracket; and wherein said connecting bracket includes a connecting plate that extends in the transverse direction and that has left and right ends, and left and right support plates that extend respectively and transversely from said left and right ends of said connecting plate to flank opposite ends of said tubular casing, said connecting plate being adapted to be connected securely to the other one of the front and rear wheel-carrying frame members, said left and right support plates having said opposite ends of said tubular casing mounted rotatable thereon, and further having opposite end portions of said coupling shaft mounted non-rotatably thereon.

2. The shock-absorbing joint as defined in claim 1, wherein said spiral spring plate defines clearances between adjacent ones of said turns thereof and between an innermost one of said turns and said coupling shaft, said shock-absorbing joint further comprising a cushioning filler made from an elastomeric material, said filler being disposed in said tubular casing and filling said clearances defined by said spiral spring plate.

3. The shock-absorbing joint as defined in claim 1, further comprising a pair of cap members, each of which has an outer portion that is mounted non-rotatably on a respective one of said left and right support plates, and an inner portion that extends into a respective one of said opposite ends of said tubular casing.

4. The shock-absorbing joint as defined in claim 3, wherein said left and right support plates are formed with non-circular openings therethrough, said outer portion of each of said cap members having a cross-section that complements said non-circular opening in the respective one of said left and right support plates to enable non-rotatable engagement of said cap members with said left and right support plates in said non-circular openings.

5. The shock-absorbing joint as defined in claim 3, further comprising a pair of bearing members to couple rotatably and respectively said opposite ends of said tubular casing and said inner portions of said cap members.

6. The shock-absorbing joint as defined in claim 3, wherein:

each of said opposite end portions of said coupling shaft is formed with a non-circular cross-section along a plane transverse to the central axis; and said inner portion of each of said cap members is formed with a socket that engages non-rotatably a respective one of said end portions of said coupling shaft.

7. The shock-absorbing joint as defined in claim 6, wherein each of said end portions of said coupling shaft is formed with an internally threaded axial bore, said shock-absorbing joint further comprising a pair of screw fasteners, each of which extends through a respective one of said cap members and engages said axial bore in a respective one of said end portions of said coupling shaft.

8. The shock-absorbing joint as defined in claim 1, wherein said connecting plate is curved with respect to the central axis of said accommodating space, and has a pair of abutment edges that interconnect said left and right ends of said connecting plate, said tubular casing having an outer circumferential wall, a portion of which being proximate to and surrounded by said connecting plate.

9. The shock-absorbing joint as defined in claim 8, further comprising a stop member mounted on said outer circumferential wall of said tubular casing, said stop member being rotatable with said tubular casing relative to said connecting bracket and being capable of abutting against one of said abutment edges of said connecting plate to limit rotation of said tubular casing relative to said connecting bracket in a certain direction.

10. The shock-absorbing joint as defined in claim 9, wherein said stop member is made of an elastomeric material.

11. The shock-absorbing joint as defined in claim 10, wherein said one of said abutment edges of said connecting plate is formed with a notch that is registered with said stop member on said tubular casing.

12. The shock-absorbing joint as defined in claim 10, further comprising a screw fastener for mounting said stop member on said tubular casing.

13. The shock-absorbing joint as defined in claim 8, wherein said outermost end of said spiral spring plate is formed with a threaded hole therethrough, said tubular casing being formed with a radial hole that is aligned with said threaded hole, said shock-absorbing joint further comprising a fastener plate disposed on said outer circumferential wall of said tubular casing, and a screw fastener extending through said fastener plate and said radial hole in said tubular casing, and that engages said threaded hole in said spiral spring plate, thereby connecting securely said outermost end of said spiral spring plate to said tubular casing.

14. The shock-absorbing joint as defined in claim 13, wherein said fastener plate has one edge proximate to one of said abutment edges of said connecting plate and provided with a cushioning bumper, said cushioning bumper being rotatable with said tubular casing relative to said connecting bracket and being capable of abutting against said one of said abutment edges of said connecting plate to limit rotation of said tubular casing relative to said connecting bracket in a certain direction.

15. The shock-absorbing joint as defined in claim 14, wherein said cushioning bumper is made of an elastomeric material.

16. The shock-absorbing joint as defined in claim 1, wherein said coupling shaft is formed with an axially extending slot for engaging securely said innermost end of said spiral spring plate.

17. The shock-absorbing joint as defined in claim 1, wherein said innermost end of said spiral spring plate is connected securely to said coupling shaft.

\* \* \* \* \*